United States Patent
DePena, II

(10) Patent No.: US 9,944,124 B1
(45) Date of Patent: Apr. 17, 2018

(54) AUTOMOBILE TRACTION TRACK SYSTEM AND DEVICE

(71) Applicant: Bolivar J. DePena, II, San Antonio, TX (US)

(72) Inventor: Bolivar J. DePena, II, San Antonio, TX (US)

(*) Notice: Subject to any disclaimer, the term of this patent is extended or adjusted under 35 U.S.C. 154(b) by 0 days.

(21) Appl. No.: 15/296,412

(22) Filed: Oct. 18, 2016

(51) Int. Cl.
*B60B 39/12* (2006.01)

(52) U.S. Cl.
CPC ........ *B60B 39/12* (2013.01); *B60B 2900/721* (2013.01)

(58) Field of Classification Search
CPC ..................................................... B60B 39/12
USPC ............................................................ 238/14
See application file for complete search history.

(56) References Cited

U.S. PATENT DOCUMENTS

| | | | | | |
|---|---|---|---|---|---|
| 1,375,666 | A * | 4/1921 | Bauer | ................ | B60B 39/12 152/226 |
| 1,863,316 | A * | 6/1932 | Webster, Jr. | ............ | B60B 39/12 238/14 |
| 2,422,006 | A * | 6/1947 | Friedman | ................ | B60B 39/12 238/14 |
| 3,701,474 | A * | 10/1972 | Welz | ................ | B60B 39/12 14/73 |
| 3,918,638 | A * | 11/1975 | Nelson | ................ | B60B 39/12 238/14 |
| 4,211,366 | A * | 7/1980 | Czarnota | ................ | B60B 39/12 238/14 |
| 4,265,399 | A * | 5/1981 | Covington | ............. | B60B 39/12 238/14 |
| 4,681,482 | A * | 7/1987 | Arciszewski | ............ | E01C 9/08 14/2.4 |
| 5,862,983 | A * | 1/1999 | Andrus | ................ | E01C 9/08 238/14 |
| 6,394,362 | B1 * | 5/2002 | Kramr | ................ | B60B 39/12 238/14 |
| 6,575,660 | B1 * | 6/2003 | Davis | ................ | E01C 9/086 238/14 |
| 6,779,738 | B1 * | 8/2004 | Stannard | ................ | B60B 39/12 238/14 |
| 8,448,877 | B1 * | 5/2013 | Aubin | ................ | B60C 27/00 238/14 |
| 2012/0273582 | A1 * | 11/2012 | Lynn | ................ | B60B 39/12 238/14 |
| 2016/0083926 | A1 * | 3/2016 | Rosier | ................ | E02D 5/80 52/155 |

(Continued)

*Primary Examiner* — Jason C Smith
(74) *Attorney, Agent, or Firm* — Kammer Browning PLLC

(57) ABSTRACT

Disclosed herein a system and device for providing traction for car wheels in situations in which a vehicle may be stuck or immobilized. The device or system, or Flexible Traction Track, is designed to assist a motor vehicle operator to successfully recover from being stranded off paved road surfaces such as sand, dirt, mud, gravel, ice or snow. The basic elements and features of the preferred embodiment include two tracks providing traction, connected by cables to enable proper place around or under the tire. During use, section one (1) is positioned against the front (leading) edge of a (spinning) tire mounted on any of the powered wheel (axel), between the tire and the ground cover or surface. Once section one (1) and three (3) have been bridged by section two (2) around a tire, the operator may then successfully drive over the terrain.

8 Claims, 2 Drawing Sheets

(56) References Cited

U.S. PATENT DOCUMENTS

2017/0100963 A1\* 4/2017 Dagrossa ................ B60B 39/12
2017/0136817 A1\* 5/2017 Rosier .................... B60B 39/12

\* cited by examiner

AUTOMOBILE TRACTION TRACK SYSTEM AND DEVICE

BACKGROUND OF THE INVENTION

1. Field of the Invention

The invention relates to automobiles and automobile accessories.

2. Description of the Related Art

Vehicles often find themselves stuck due to the inability to gain traction over a certain ground surface or condition. Such conditions include examples such as ice, snow, sand, mud, or dirt. Previous devices have been made to be placed under or in front of a tire in order to provide traction over the ground surface. However such devices have significant limitations, and mainly comprise a single piece of plastic material designed to be wedged in front of the wheel. Such devices do not include a means of placing a traction system in front of and behind the tire, such as the cables of section 2 described herein. Further the prior art does not include stakes or other means of stabilizing the device to the ground, helping to provide a steady surface to drive over. Without such design features as included with the invention herein, a spinning tire may often simply pull the device under the tire and eject it out behind the tire without enabling the vehicle to move forward. Thus there remains a significant need for systems and devices that fully enable a vehicle to extract itself from difficult conditions by providing a stable surface providing the needed traction.

SUMMARY OF THE INVENTION

Disclosed herein a system and device for providing traction for car wheels in situations in which a vehicle may be stuck or immobilized. The device or system, or Flexible Traction Track (or "Track"), is designed to assist a motor vehicle operator ("Operator") to successfully recover from being stranded off paved road surfaces such as sand, dirt, mud, gravel, ice or snow (or any surface in which traction is lost or the wheel's function is in some way inhibited).

The basic elements and features of the preferred embodiment include two tracks providing traction, connected by cables to enable proper place around or under the tire. Any material capable of increasing or promoting friction may be appropriate for the tracks design, or the design of its covering. The second section, section (2) consists of a heavy duty flexible, detachable cable that bridges sections one (1) and three (3) to facilitate access around the front or rear tires, depending on whether the vehicle is front or rear wheel drive. However any tire connected to a drive axel may be utilized. Section three (3) is an open framed cable construction similar to section (1) without Material and includes four (4) "eye rings" at each corner, on both ends, used to insert stabilizer stakes ("Stakes") which secure this section in place and in line with the vehicles wheels and directional path (whether moving forward or in reverse) and is intended to be incorporated as part of section three (3).

During use, section one (1) is positioned against the front (leading) edge of a (spinning) tire mounted on any of the powered wheel (axel), between the tire and the ground cover or surface. Once section one (1) and three (3) have been bridged by section two (2) around the front tire (or rear depending on drive and direction), the operator then slowly and cautiously accelerates pulling or threading section one (1) under the tire and above the ground cover or surface and the slack in section (2) is removed (taught) then the vehicle is able to maneuver away, allowing the operator to move the vehicle to safer ground or area. Once safe the operator may recover the Tack and stow for later use, if needed.

DETAILED DESCRIPTION OF THE PREFERRED EMBODIMENTS

Disclosed herein a system and device for providing traction for car wheels in situations in which a vehicle may be stuck or immobilized. The device or system, or Flexible Traction Track (or "Track"), is designed to assist a motor vehicle operator ("Operator") to successfully recover from being stranded off paved road surfaces such as sand, dirt, mud, gravel, ice or snow (or any surface in which traction is lost or the wheel's function is in some way inhibited).

Figure 1:
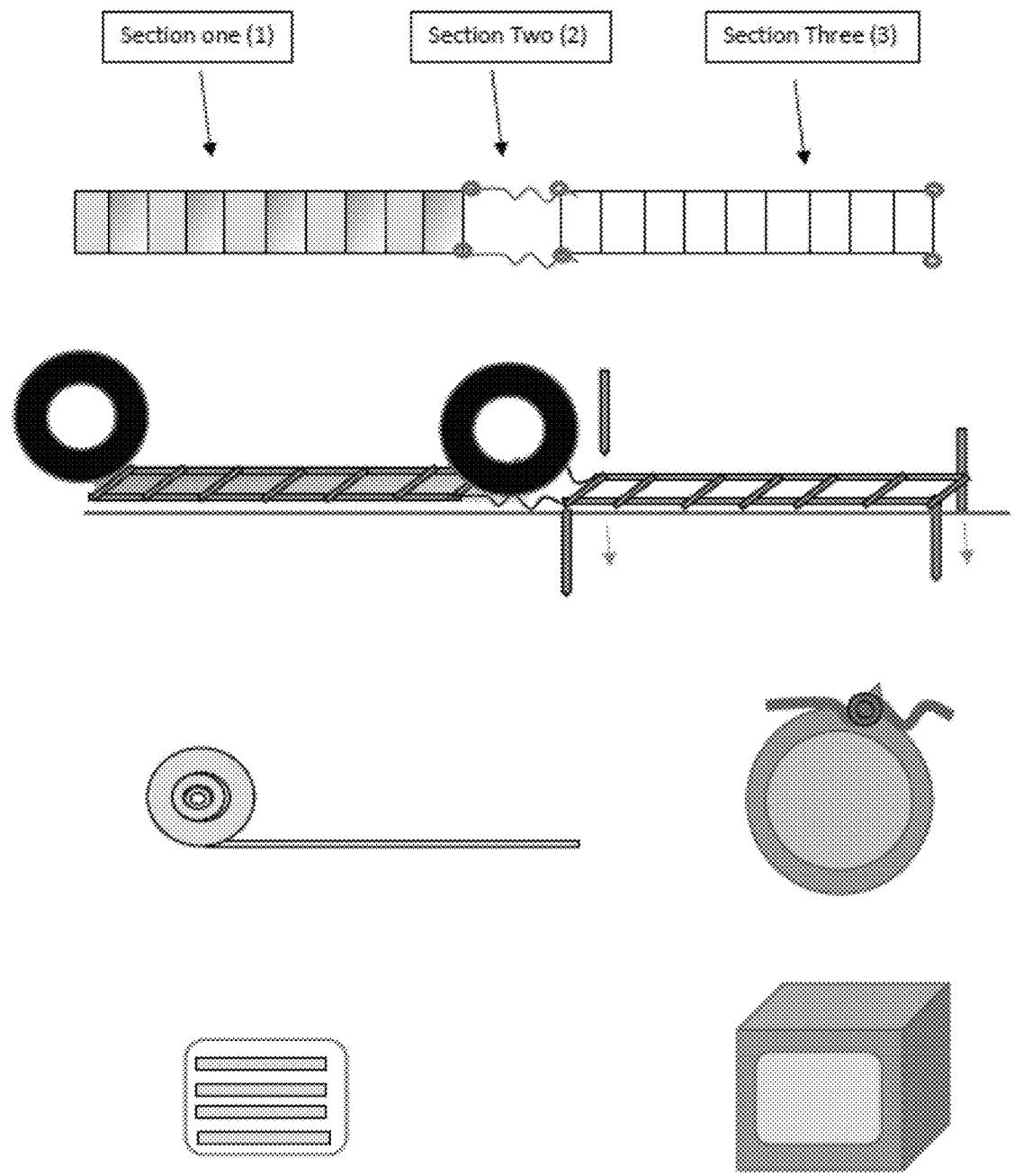
FIG. 1 shows the different sections making up the preferred embodiment of the invention herein. Also shown is the placement of the system in relation to the tires of a stuck vehicle. Further shown is means of carrying or storing the system.

The basic elements and features of the preferred embodiment are best explained by referring to FIG. 1. In FIG. 1, section 1 in the preferred embodiment may be a flexible weaved or crimped steel, nylon, rubber or plastic (or similar materials) aligned, parallel design with cross-members sections connecting the two sides, constructed from cable, line, or chain ("Cables") or an equivalent as would be recognized by those skilled in the art. A portion of the track, section one (1), may be integrated with a durable material such as industrial strength canvass, Kevlar, rubber, plastic or polymer with surfaces that promotes traction ("Material"). Any material capable of increasing or promoting friction may be appropriate. The second section, section (2) consists of a heavy duty flexible, detachable cable that bridges sections one (1) and three (3) to facilitate access around the front or rear tires, depending on whether the vehicle is front or rear wheel drive. However any tire connected to a drive axel may be utilized. Section three (3) is an open framed cable construction similar to section (1) without Material and includes four (4) "eye rings" at each corner, on both ends, used to insert stabilizer stakes ("Stakes") which secure this section in place and in line with the vehicles wheels and directional path (whether moving forward or in reverse) and is intended to be incorporated as part of section three (3).

During use, section one (1) is positioned against the front (leading) edge of a (spinning) tire mounted on any of the powered wheel (axel), between the tire and the ground cover or surface. Once section one (1) and three (3) have been bridged by section two (2) around the front tire (or rear depending on drive and direction), the operator then slowly and cautiously accelerates pulling or threading section one (1) under the tire and above the ground cover or surface and the slack in section (2) is removed (taught) then the vehicle is able to maneuver away, allowing the operator to move the vehicle to safer ground or area. Once safe the operator may recover the Tack and stow for later use, if needed.

The Material is designed to insulate the tires from adverse ground cover or surfaces ("Ground") thus creating a physical barrier that facilitates traction. The integrated Cables are designed for strength and to allow the tire tread patterns to catch and grip the staggered cross-members creating an addition source of traction. The second section is adjustable to compensate to various vehicle specifications and wheelbase and sizes allowing the Track to be used on a great variety of vehicles and to further facilitate ease of use. The third section has exposed Cables, staggered cross-members helps the front or rear tire (depending on vehicle drive) from sinking or slipping on Ground cover or surface, by creating a more stable surface area for the tire to travel as well as reducing the displacement ration of Ground to tire surfaces.

The Track can be used on one or both sides of a vehicle (if used as a set), underneath one, two, or even all wheels. The system and device may be designed in various embodiments to accommodate the type of vehicle. The size may vary accordingly. For a front or rear wheel drive car type vehicle, one or two appropriately sized devices may be used and positioned underneath the wheels connected to the drive axel. In other embodiments a system utilizing four devices may be used for all wheel drive vehicles. Larger devices may be designed in still other embodiments to accommodate larger vehicles. A system incorporating multiple track devices of an appropriate larger size, whereby multiple sections of 1, 2, and 3 are connected to accommodate use with a large semi-truck or 18 wheeler may also be designed across the various embodiments.

The Track in the preferred embodiment is composed of three (3) sections which may vary in length and width (depending on vehicle or tire specifications), that can be easily attached and detached to each other in sequence. The track may be designed to accommodate a specific type of vehicle or wheel, or may be designed to be more universal in nature.

For storage and transport the track can be rolled in a compact configuration and stored in a carry bag or box (see diagram of FIG. 1) for easy and compact storage in back or trunk of vehicle or garage.

The various materials that may be used include those disclosed herein as well as those alternatives that would be apparent to those skilled in the art. Further the track may be coated or covered with a number of different materials to increase the friction and traction. The track may also be differentially coated or textured to maximize its efficacy (see FIGS. 2 and 3). For example in one embodiment the top of the track may designed to maximize traction to the rubber surface of the tire. The bottom of the track may then be designed to maximize traction with the ground surface or whatever the tire is in contact with such as snow, ice, sand etc. The bottom in certain embodiment may even be outfitted with small spikes or other features that would be ideal for the given surface conditions (see the example of FIG. 3). Further, in FIG. 4, the device or system may be designed to accommodate different attachments to texturize the underside of the track appropriate the current conditions. FIG. 4 shows and example of a spiked attachment for use on an icy surface.

In alternative embodiments section 3 may be available with Material (like Section One) as an option. In light of the alternative embodiments discussed in the previous paragraph or those concepts shown in FIG. 4, the material used in the preferred embodiment to cover section 1, may be also be used or altered to cover any of the sections. In such embodiments the system may come with different types of materials designed to have different textures and features useful for specific conditions. The material may be then be placed over and secured to the track according to the conditions.

Figure 2:
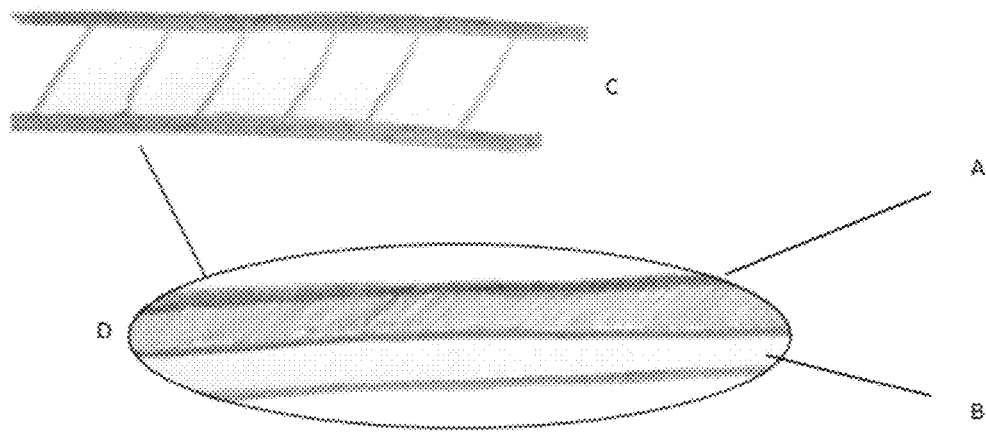
FIG. 2 is a simple schematic showing the areas of the track that may be differentially textured, top and bottom.
Figure 3:
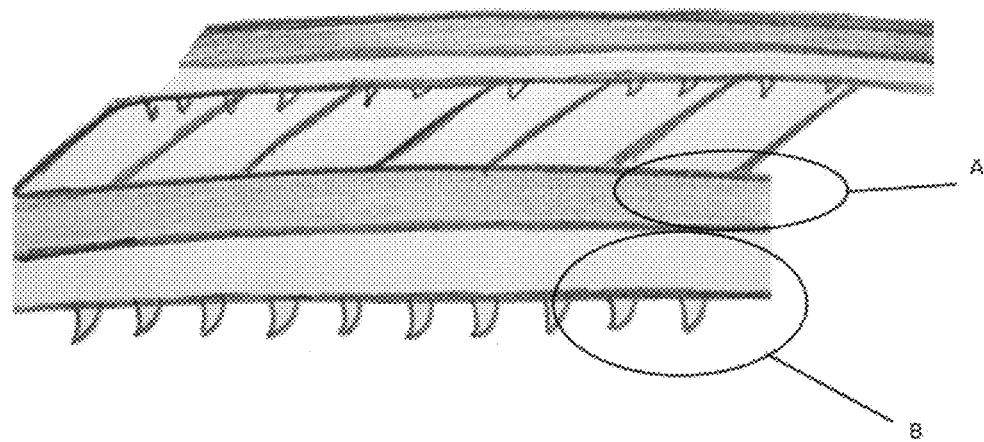
FIG. 3 is one embodiment of the concept shown in FIG. 2. The track is outfitted with a textured top area designed to provide maximum traction with a rubber surface (tire), while the bottom area it outfitted with small spikes ideal for providing traction against ice.

Now turning to the figures, FIG. 1 shows the different section making up the preferred embodiment of the invention herein. Also shown is the placement of the system in relation to the tires of a stuck vehicle. Further shown is means of carrying or storing the system. FIG. 2 is a simple schematic showing the areas of the track that may be differentially textured, top and bottom. C refers to the entire device as shown, D is a close up of one of the parallel track cables. Within the close up A refers to the top portion that would contact the tire, of one texture. B refers to the underside portion of the track cable of a second texture. FIG. 3 is one embodiment of the concept shown in FIG. 2. The track is outfitted with a textured top area designed to provide maximum traction with a rubber surface (tire), while the bottom area it outfitted with small spikes ideal for providing traction against ice. Circled area A refers to the top portion, B refers to the spiked underside.

For the purposes of describing and defining the present invention it is noted that the use of relative terms such as "substantially", 'generally", "approximately" and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act or instruction used in this description should be construed as important, necessary, critical or essential to the invention unless explicitly described as such. Although only a few of the exemplary embodiments have been described in detail herein and those skilled in the art will readily appreciate that many modifications are possible in these exemplary embodiments without materially departing from the novel teachings and advantages of this invention. Accordingly all such modifications are intended to be included within the scope of this invention.

The phrase "in one embodiment" is used repeatedly. The phrase generally does not refer to the same embodiment; however, it may. The terms "comprising," "having" and "including" are synonymous, unless the context dictates otherwise. The following illustrations of various embodiments use particular terms by way of example to describe the various embodiments, but this should be construed to encompass and provide for terms such as "method" and "routine" and the like.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

The characteristics and utilities of the present invention described in this summary and the detailed description below are not all inclusive. Many additional features and advantages will be apparent to one of ordinary skill in the art given the following description. There has thus been outlined, rather broadly, the more important features of the invention in order that the detailed description thereof that follows may be better understood, and in order that the present contribution to the art may be better appreciated.

In this respect, by explaining at least one embodiment of the invention in detail, it is to be understood that the invention is not limited in its application to the details of construction and to the arrangements of the components set forth in the description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, nor is it intended to be limiting as to the scope of the invention in any way. The characteristics and utilities of the present invention described in this summary and the detailed description below are not all inclusive. Many additional features and advantages will be apparent to one of ordinary skill in the art given the detailed description.

I claim:

1. A device for providing vehicle tire traction comprising:
   a first track section comprising an essentially linear first piece of material connected to an essentially linear second piece of material, the first and second pieces of material being aligned parallel and spaced apart, connected by a plurality of evenly spaced essentially perpendicular cables;
   a second track section comprising two parallel cables, the parallel cables positioned apart from each other and defining an open space there between wide enough to accommodate the width of a vehicle tire; and
   a third track section comprising an essentially linear third piece of material connected to an essentially linear fourth piece of material, the third and fourth pieces of material being aligned parallel, connected by a plurality of essentially perpendicular cables;
   wherein the first and third track sections are connected together in an essentially linear arrangement by the two parallel cables of the second track section.

2. The device of claim 1, wherein the first track section is covered by a durable layer of barrier material, said layer of barrier material being any of industrial strength canvass, Kevlar, rubber, plastic, or a polymer with textured surfaces.

3. The device of claim 1, wherein the parallel cables of the second track section are constructed of heavy duty flexible and detachable cable or chain that extend between the first and third track sections and around a tire positioned in between the first and third track sections.

4. The device of claim 3, wherein the third track section further comprises an eye ring at each corner of the track section, a stake inserted through each of the eye rings to stabilize the device.

5. A system for providing vehicle tire traction comprising a plurality of the devices of claim 4.

6. The system of claim 5, wherein the system comprises two traction devices per drive axel of the vehicle.

7. The system of claim 6, wherein a top surface of each linear piece of material is texturized to maximize traction against the rubber tread surface of a tire, and the underside of each linear piece of material is texturized to maximize friction with a ground surface according to conditions.

8. The system of claim 6, wherein a texturized cover material is secured to the top, bottom, or both sides of each of the linear pieces of material.

* * * * *